United States Patent
Tran et al.

(10) Patent No.: US 6,286,021 B1
(45) Date of Patent: Sep. 4, 2001

(54) APPARATUS AND METHOD FOR A REDUCED COMPLEXITY TAP LEAKAGE UNIT IN A FAST ADAPTIVE FILTER CIRCUIT

(75) Inventors: Hiep V. Tran; Richard X. Gu, both of Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/176,684

(22) Filed: Oct. 21, 1998

Related U.S. Application Data

(60) Provisional application No. 60/062,703, filed on Oct. 22, 1997.

(51) Int. Cl.[7] ................................................. G06F 17/10
(52) U.S. Cl. .............................................. 708/322; 708/323
(58) Field of Search ................................... 708/322, 323

(56) References Cited

U.S. PATENT DOCUMENTS

| | | | |
|---|---|---|---|
| 5,768,313 | * | 6/1998 | Kuribayashi ........................ 708/322 |
| 5,805,481 | * | 9/1998 | Raghunath .......................... 708/322 |
| 5,933,452 | * | 8/1999 | Eun ..................................... 708/322 |
| 5,937,007 | * | 8/1999 | Raghunath .......................... 708/323 |
| 6,108,681 | * | 8/2000 | Wittig et al. ....................... 708/322 |
| 6,151,614 | * | 11/2000 | Ikeda .................................. 708/322 |

* cited by examiner

*Primary Examiner*—David H. Malzahn
(74) *Attorney, Agent, or Firm*—J. Dennis Moore; W. James Brady, III; Frederick J. Telecky

(57) ABSTRACT

In a fast adaptive filter unit, an update unit replaces the multiplier unit which generates a product of the filter constant, the error signal and data signal and adding this product to a previously generated coefficient with a reduced complexity unit. The reduced complexity unit determines the sign of the product and whether the product is zero or non-zero. As a result of this determination a two bit signal is generated which is used to either increment or decrement the count in a register in the counter unit. The count held by the register is the coefficient signal, the coefficient signal being updated by each additional operation. In order to prevent the register from over-flowing, a second counter applies a signal periodically to the counter unit which decrements the magnitude of coefficient signal stored in the register by one count.

12 Claims, 2 Drawing Sheets

APPARATUS AND METHOD FOR A REDUCED COMPLEXITY TAP LEAKAGE UNIT IN A FAST ADAPTIVE FILTER CIRCUIT

This application claims priority under 35 USC 119(e)(1) of provisional application Ser. No. 60/062,703 filed Oct. 22, 1997.

BACKGROUND OF THE INVENTION

1. Field of the Invention

This invention relates generally to the processing of signals in communication systems and, more particularly, to the equalizer circuit units. Equalizer circuits or adaptive filter units are used to compensate for distortion introduced into the channel during the transmission of signals. The present invention has particular applicability to transceiver circuits and modem units.

2. Description of the Prior Art

Referring to FIG. 1, a block diagram of a transceiver circuit capable of advantageously using the present invention is shown. INPUT SIGNALS are applied to symbol decoder and side-stream descrambler unit 11. Output signals from the symbol encoder and side-stream scrambler unit 11 are applied to transmitter unit A 15 and to transmitter unit B 13. The output signals from transmitter unit A 15 are applied to hybrid unit 18, while the output signals from transmitter unit B 13 are applied to hybrid unit 17. The output signals from hybrid unit 17 and hybrid unit 18 are applied to cable 19. Signals from cable 19 are transmitted through hybrid unit 17 to receiver unit B 14 and through hybrid unit 18 to receiver unit A 16. The output signals from receiver unit A 16 and from receiver unit B 14 are applied symbol decoder and side-stream descrambler unit 12. The output signals from the symbol decoder and side-stream descrambler unit 12 are the OUTPUT SIGNALS from the transceiver.

In the transmitter unit A 15, the input signals are applied to a digital transmit filter unit 151. The output signals from the digital transmit filter unit 151 are processed by an digital-to-analog converter unit 152 and applied to an analog transmit filter unit 153. The output signal of the analog transmit unit 153 is the output signal of the transmitter A 15 which is applied to a hybrid unit 18. The transmitter B 13 is implemented in a similar manner.

With respect to the receiver A 16, the output signals from the hybrid unit 18 are applied to a VGA unit 169. The output signals from the VGA unit 169 are processed by an analog receive filter unit 168 and applied to an analog-to-digital converter unit 167. Output signals from the analog-to-digital converter unit 167 are applied to a digital linear forward equalizer unit 166 and to a gain, timing, control unit 170. The signals from the digital linear forward equalizer unit 166 are applied to a summation network 165 and to the gain, timing and control unit 170. The gain, timing and control unit 170 applies control signals to the VGA unit 169 and to the analog-to-digital converter unit 167. The summation unit 165 also receives signals from an echo canceller unit 161, from a NEXT canceller unit 162 and from a feedback filter/noise predictor unit 164. Output signals from the summation unit 165 are applied to a decision unit 163. The decision unit 163 provides the output signal for receiver A 16. The output signal from the decision unit 163 is also applied to the feedback filter/noise prediction unit 164. The decision unit 163 also applies an error signal to the echo canceller unit 161, NEXT canceller unit 162, digital linear forward equalizer unit 166, and feedback filter/noise reduction unit 164. The echo canceller unit 161 also receives signals which are applied to the transmitter A 15 associated with the receiver A 16, while the NEXT canceller unit 162 receives an input signal from the transmitter B 13 not associated with the receiver unit A 16 which includes the NEXT canceller unit 162. The receiver B 13 is implemented in a manner similar to receiver A 16.

Referring to FIG. 2, a block diagram of an adaptive equalizer filter unit 20, such as would be used to implement the echo canceller unit 161 and the NEXT canceller unit 162 of FIG. 1, is shown. The equalizer unit 20 includes a multiplicity N of stages. Each stage n of the equalizer unit 13 includes a delay line $D_n$, (the delay line Do is shown with dotted lines because the presence of this delay line is not needed to the operation of filter 20. The delay lines $D_0$–$D_{N-1}$ of all of the stages are coupled in series. The output terminal of each delay line $D_n$ is coupled, in addition to being coupled to the next sequential delay line $D_{n+1}$, to a multiplier unit $M_n$ associated with the $n^{th}$ stage and to an input terminal of update unit $U_n$ associated with the $n^{th}$ stage. Each multiplier unit $M_n$ also receives a coefficient signal $C_n$. The coefficient signal $C_n$ is a signal group stored in the update unit $U_n$ which is updated $U_n$ in response to an ERROR signal e and the output signal of delay line $D_n$. An ERROR signal e is generated as a result of each signal group processed in the decision unit shown in FIG. 1. The product of the signals $C_n$ and the output signal from delay line $D_n$ formed in multiplier unit $M_n$ is applied to one terminal of adder unit $A_m$. The adder unit $A_m$ also receives an output signal from one of the neighboring filter stages. The adder units $A_0$–$A_{M-1}$ are the first stage of an adder tree, the remaining adder units would be included in element 29. The output signals of the adder tree, including the adder units $A_0$–$A_{M-1}$ and the element 29, are the DATA OUT signals (X').

The signals applied to the multiplier unit $M_n$ of an adaptive or equalizer filter are the following:

$X_n$ is the output signal from delay line $D_n$, and $C_{n,t+1}$ is given by the formula $C_{n,t+1} = C_{n,t} + \mu e_t X_{n,t-1}$ Referring to FIG. 3, a schematic block diagram of an update unit 30 ($U_n$) is shown. The update unit 30 has a multiplier unit 31 which receives the filter constant $\mu$, the error signal $e_t$, and the data signal $X_{n,t}$. The product formed by these three quantities are applied to an input terminal of adder unit 33. Also applied to an input terminal of adder unit 33 is the previously formed coefficient $W_{n,t-1}$ stored in register 32. The output signal of adder unit 33 is the coefficient $W_{n,t}$. The coefficient $W_{n,t}$ is applied to multiplier unit $M_n$ associated with same stage of the adaptive filter unit as the update unit $U_n$ and the coefficient $W_{n,t}$ is applied to register 32 to be used in generating the next coefficient $W_{n,t+1}$.

As will be clear to those skilled in the art, the implementation of the update units $U_0$–$U_{N-1}$ require a relatively large number of components to implement, each update unit including both a multiplier unit and an adder unit. This apparatus is required in each stage of the adaptive filter.

A need has therefore been felt for apparatus and an associated method to reduce the number of components required to implement an adaptive filter unit and particularly, the update unit thereof.

SUMMARY OF THE INVENTION

The aforementioned and other features are accomplished, according to the present invention, replacing the multiplier unit with apparatus for representing the product of the filter constant, the error signal, and data signal with a single logic bit and an associated sign. The output signal or product of the apparatus is then applied to a counter unit. The counter unit accumulates the signed product logic bits, i.e., the sum of the signed product bits. This sum of the signed product bits is the coefficient $W_{n,t}$, and the next signal product bit added thereto generates the coefficient $W_{n,t+1}$. In order to prevent an overflow of the counter, a logic bit is periodically subtracted from the accumulated sum.

These and other features of the present invention will be understood upon the reading of the following description in conjunction with the Figures.

DESCRIPTION OF THE PREFERRED EMBODIMENT(S)

1. Detailed Description of the Drawings

Figure 1:
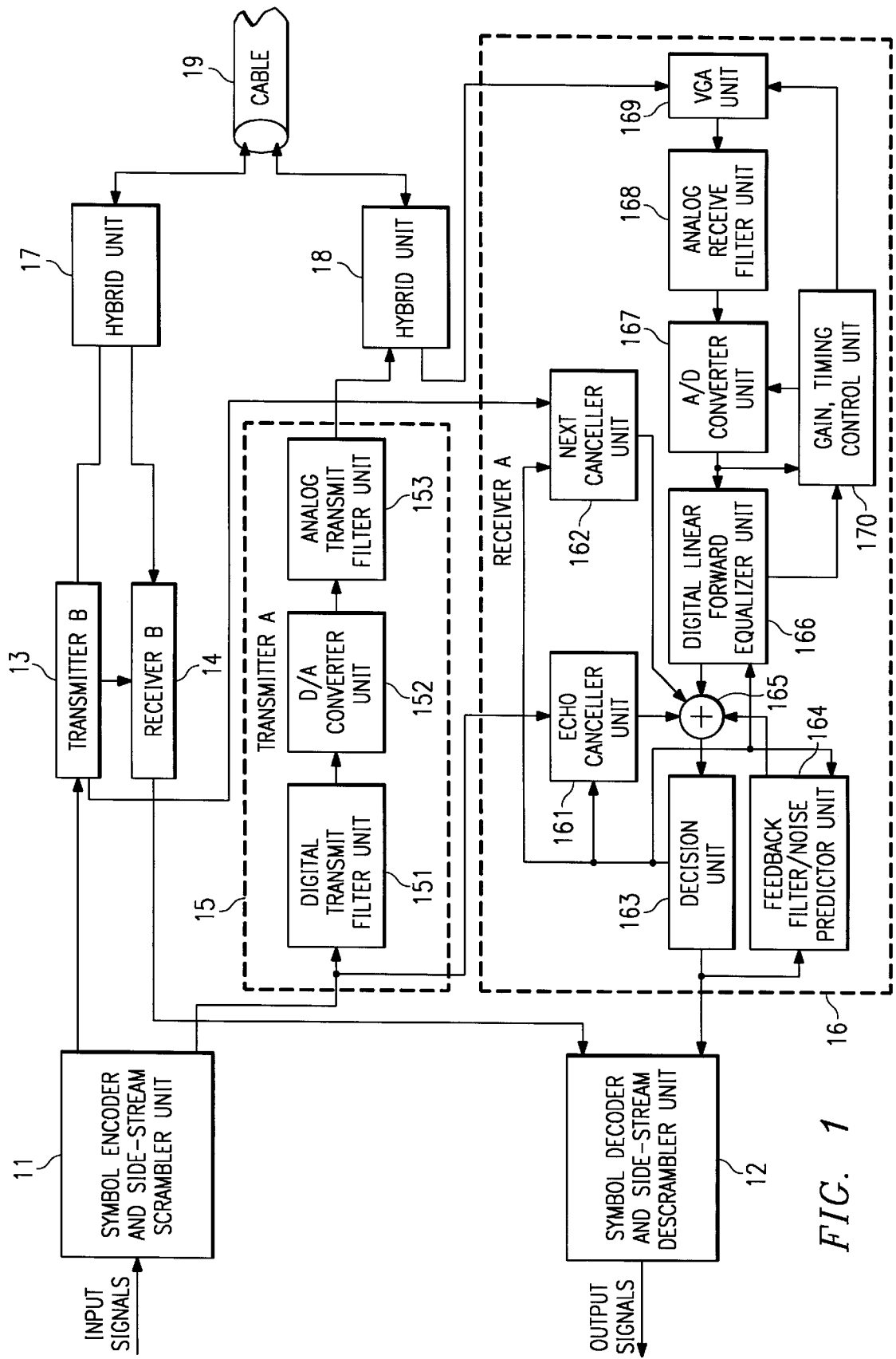
FIG. 1 is a block diagram of a transceiver unit in which the reduced error bit technique in a fast adaptive filter unit of the present invention can be advantageously implemented.
Figure 2:
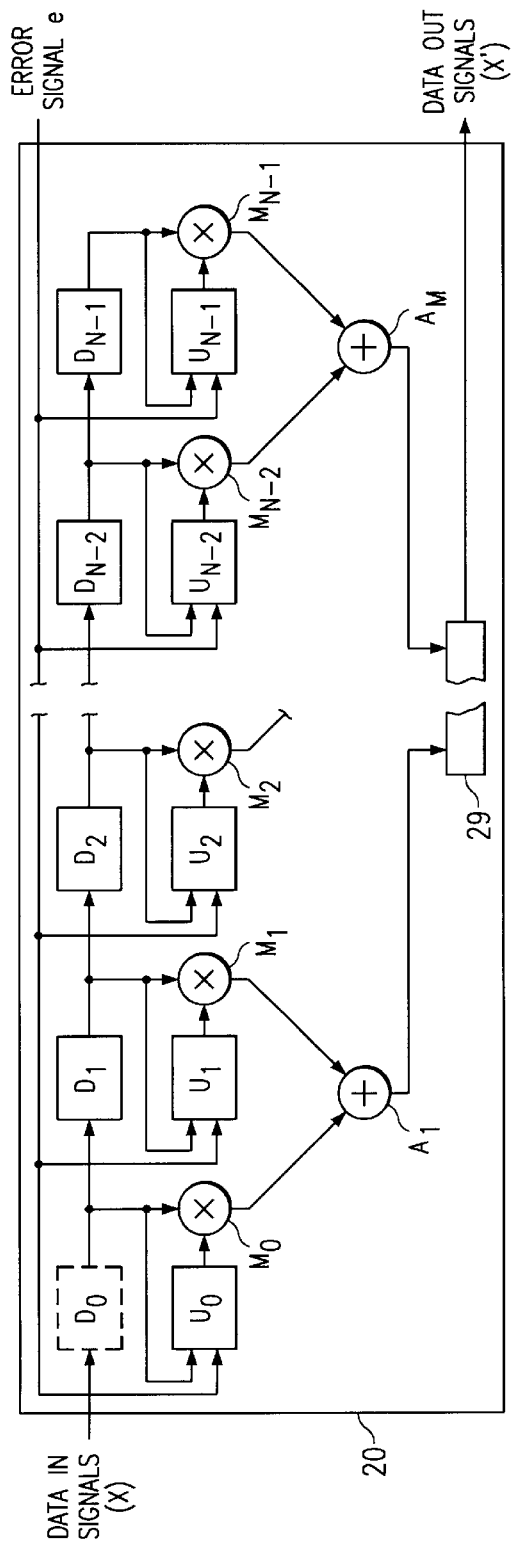
FIG. 2 is a schematic block diagram of an adaptive filter unit according to the prior art.
Figure 3:
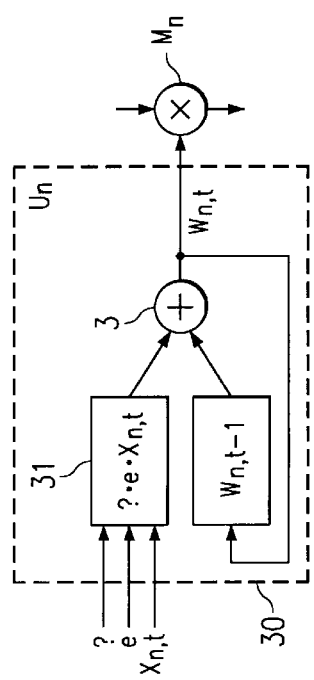
FIG. 3 is a schematic block diagram of an update unit of an adaptive filter unit implemented according to the prior art.

FIG. 1, FIG. 2, and FIG. 3 have been described with respect to the prior art.

Figure 4:
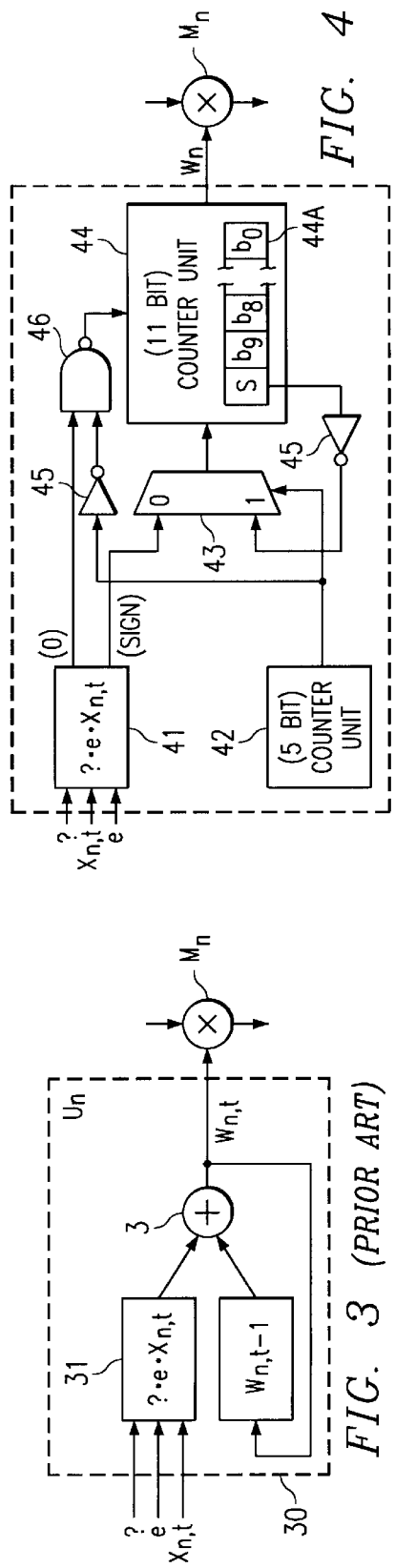
FIG. 4 is a schematic block diagram of an update unit implemented according to the present invention.

Referring next to FIG. 4, an update unit $U_n$ according to the present invention is shown. The filter constant $\mu$, the error signal $e_t$, and the data signal $X_{n,t}$ are applied to unit 41. Unit 41, instead of multiplying these quantities together to form a product, generates a logic bit indicating whether the result of the product zero. This logic bit is applied to a first input terminal of logic NAND gate 46. A second logic bit is generated by unit 41 indicating whether the product is a plus or a minus quantity. The second output signal of unit 41 signal is applied to first input terminals of multiplexer unit 43. An output signal from a (5 bit) counter 42 is applied to a second input terminal of multiplexer unit 43 and provides the control (selection) signal to the multiplexer unit 43. The output signal of counter unit 42 is applied through inverting amplifier 45 to a second input terminal of logic NAND gate 46. During normal operation, the second output signal from unit 41 is applied to counter unit 44 and either increments or decrements the contents of the register 44A. The output signal from logic NAND gate 46 freezes the counter 44 when an appropriate logic signal is applied to the input terminal. The counter unit 44 has stored therein the current coefficient signal $W_{n,t}$ in register 44A. The sign signal from the sign bit position of register 44A is applied through inverter unit 45 to a second input terminal of multiplexer unit 43. Periodically, the counter unit 42 causes the signal applied to the second terminal to be transmitted through multiplexer unit 43 to the counter unit 44. This second signal when applied to counter unit 44A, results in decrementing the absolute magnitude of the quantity stored in counter unit 44. The quantity in counter unit 44, the coefficient $W_{n,t}$, is applied to multiplier unit $M_n$ to provide one input for this multiplier unit.

2. Operation of the Preferred Embodiment(s)

The present invention provides a update unit for use in an adaptive or equalizer filter unit that is much less complex than the update unit typically used in an adaptive filter unit. Because the filter constant is typically chosen to be positive, the sign generated by unit 41 of FIG. 4 need only be a comparison of the signs of the error signal and the data signal. Similarly, unit 41 need only further determine either the error signal and/or the data signal is zero. When either signal is a logic zero, no change is made the counter unit 44 containing the coefficient signal. Otherwise, a logic one is transmitted and either added to or subtracted from the accumulated sum in register 44A in counter unit 44. However, the present technique suffers from the problem that, under certain circumstances, register 44A in counter unit 44 may overflow. To avoid this overflow, the counter unit 42, inverter unit 45 and the multiplexer unit 43 have been added. In this manner, the magnitude of the sum in counter unit 44 can periodically be reduced. This periodic reduction in the magnitude of the quantity stored in counter unit 44 is generally referred to as leakage.

As will be clear, in the present invention, however large an error signal is generated and applied to the update units, the coefficient signal is only incremented by one unit. This limitation on the response of the update unit to an error signal results in a decreased time reach equilibrium. Thus, the trade-off offered by the present invention is a simpler and perhaps faster update apparatus in a plurality of units achieved at the expense of a longer response time.

While the invention has been described with particular reference to the preferred embodiment, it will be understood by those skilled in the art that various changes may be made and equivalents substituted for elements of the preferred embodiment without departing from the invention. In addition, many modifications may be made to adapt a particular situation and material to a teaching of the present invention without departing from the essential teachings of the present invention.

As is evident from the foregoing discussion, certain aspects of the invention are not limited to the particular details of the examples illustrated, land it is therefore contemplated that other modifications and applications will occur to those skilled in the art. It is accordingly intended that the claims shall cover all modifications and applications as do not depart from the spirit and scope of the invention.

What is claimed is:

1. In an adaptive filter unit, an update unit associated with each stage of said adaptive filter unit, said update unit comprising:

a signal generating unit for generating a sign logic bit signal and a zero/non-zero logic bit signal in response to an error signal and a data signal;

a first counter unit for periodically generating a first signal;

a second counter unit, said second counter unit including a register storing an accumulation signal;

an inverter unit having the sign bit of said accumulation signal applied thereto; and a multiplexer unit responsive to said first counter unit, said multiplexer unit having an output signal from said signal generating unit applied to a first input terminal thereof, said multiplexer unit having an output signal from said inverter unit applied thereto.

2. The update unit of claim 1 wherein said inverter unit output signal decrements a magnitude of a signed quantity in said register by a logic "one".

3. The update unit of claim 1 wherein said sign signal and said zero/non-zero signal are combined with a signed quantity in said second counter unit, such that said sign signal increments or decrements said accumulation signal, as the case may be, and said zero/non-zero signal operates, when indicating a zero, to prevent said accumulation signal from incrementing and decrementing.

4. In an adaptive filter unit, a method of generating an update coefficient signal for each stage of said adaptive filter unit, said method comprising the steps of:

generating a sign logic signal bit and a magnitude logic signal bit in response to at least a data signal and an error signal;

adding said sign logic signal bit and said magnitude logic signal bit to a previously generated coefficient signal bit group; and periodically decreasing a magnitude of said previously generated coefficient signal bit group.

5. The method of claim 4 wherein said previously generated coefficient signal bit group is generated in a counter unit.

6. In an adaptive filter unit, a method of generating an update coefficient signal for each stage of said adaptive filter unit, said method comprising the steps of:

generating a sign logic signal bit and a magnitude logic signal bit in response to at least a data signal and an error signal;

in a first mode, adding said sign logic signal bit and said magnitude logic signal bit to a previously generated coefficient signal bit group; and periodically decreasing a magnitude of said previously generated coefficient signal bit group.

7. The method of claim 6 wherein, in a second mode, said decreasing step replaces an adding step.

8. An update unit associated with each stage of an adaptive filter unit, said update unit comprising:

an accumulation unit responsive, in a first mode, to a magnitude logic bit signal and a sign logic bit signal, said accumulation unit incrementing or decrementing a signed sum stored in said accumulation unit when said magnitude logic bit signal is a logic "one"; and a counter unit, said counter unit periodically, in a second mode, applying a first signal to said accumulation unit, said accumulation unit decrementing a magnitude of said signed sum in response to said first signal.

9. The update unit of claim 8 wherein said counter unit includes a switch unit, said switch unit selecting between applying said magnitude logic bit signal and said sign logic bit signal to said accumulation unit and applying said first signal to said accumulation unit in response to said first signal.

10. The update unit of claim 9 wherein said signed sum is a coefficient signal of an adapted filter unit stage.

11. The update unit of claim 8 wherein a bit is decremented from said signed sum when a sign of said signed sum and a said sign logic bit signal are equal, and wherein a bit is incremented in said signed sum when said sign of said signed sum and said sign bit logic signal are equal.

12. The update unit of claim 8 wherein said accumulation unit is a second counter unit.

* * * * *